United States Patent [19]
Iijima

[11] Patent Number: 4,796,457
[45] Date of Patent: Jan. 10, 1989

[54] METHOD AND APPARATUS FOR PRODUCING FLANGED BUSH

[75] Inventor: Yoshio Iijima, Nagoya, Japan

[73] Assignee: Daido Metal Company Ltd., Nagoya, Japan

[21] Appl. No.: 63,716

[22] Filed: Jun. 15, 1987

Related U.S. Application Data

[63] Continuation of Ser. No. 691,705, Jan. 15, 1985, abandoned.

[30] Foreign Application Priority Data

Jul. 26, 1984 [JP] Japan ............................ 59-154124

[51] Int. Cl.$^4$ .................................................. B21D 22/00
[52] U.S. Cl. ........................................... 72/370; 72/354
[58] Field of Search ............... 10/27 R, 27 E, 27 PH; 29/149.5 R, 159.2; 72/352, 354, 367, 370

[56] References Cited

U.S. PATENT DOCUMENTS

| | | | |
|---|---|---|---|
| 2,586,336 | 2/1952 | Huck | 10/27 PH |
| 2,722,047 | 11/1955 | Cousimo | 29/149.5 R |
| 3,224,243 | 12/1965 | Van Deberg | 72/354 |
| 3,434,326 | 3/1969 | Serret | 72/354 |
| 3,780,413 | 12/1973 | Burgdorf | 29/159.2 |
| 4,008,599 | 2/1977 | Dohmann | 72/354 |
| 4,122,701 | 10/1978 | Lehnhart | 72/354 |
| 4,295,357 | 10/1981 | Roper | 72/354 |
| 4,299,112 | 11/1981 | Kondo | 72/354 |
| 4,346,581 | 8/1982 | Ando | 72/354 X |
| 4,351,177 | 9/1982 | Leykamm et al. | 72/354 |
| 4,362,043 | 12/1982 | Hanson | 72/354 |

FOREIGN PATENT DOCUMENTS

| | | | |
|---|---|---|---|
| 56-59557 | 5/1981 | Japan | 72/354 |
| 330920 | 8/1958 | Switzerland | 72/354 |
| 178574 | 4/1922 | United Kingdom . | |
| 451172 | 7/1936 | United Kingdom . | |
| 550186 | 12/1942 | United Kingdom . | |
| 723926 | 2/1955 | United Kingdom . | |
| 1289594 | 9/1972 | United Kingdom . | |

Primary Examiner—E. Michael Combs
Attorney, Agent, or Firm—Browdy and Neimark

[57] ABSTRACT

A method of producing a flanged bush comprising the steps of: preparing a die having a through bore of a configuration conforming with the outer configuration of the flanged bush to be produced, and a flange-forming punch having a large-diameter portion of a diameter equal to the outside diameter of the flanged bush and a small-diameter portion of a diameter equal to the inside diameter of the bore in the flanged bush to be produced; inserting, by a coining punch, a cylindrical stock axially into the bore in the die from one axial end of the latter; and driving the flange-forming punch into the bore in the die from the other axial end of the latter so as to press the inner end of the stock, thereby to form the flange.

6 Claims, 5 Drawing Sheets

METHOD AND APPARATUS FOR PRODUCING FLANGED BUSH

This application is a continuation, of application Ser. No. 691,705, filed Jan. 15, 1985, abandoned.

BACKGROUND OF THE INVENTION

The present invention relates to a method of and an apparatus for producing flanged bushes which are used as sliding parts for bearing both axial thrust load and radial load in various industrial machine.

Hitherto, a flanged bush of the kind described has been produced by preparing a cylindrical bush and a thrust washer separately, and fixing the thrust washer to the cylindrical bush by means of a pin or by means of adhesion or welding.

This conventional method, however, is generally difficult to conduct and suffers from low precision, due to separate formation of the cylindrical bush and the washer, resulting in a lengthy and expensive production process.

SUMMARY OF THE INVENTION

Accordingly, an object of the invention is to provide a method and an apparatus for producing flanged bushes which are improved to overcome the above-described problem of the prior art.

To this end, according to one aspect of the invention, there is provided a method of producing flanged bushes comprising the steps of: inserting, by a coining punch, a cylindrical stock into a bore formed in a die axially from one end of the die, the bore having a configuration conforming with the final shape of the flanged bush; and driving a flange-forming punch into the bore from the other end of the die thereby to press the inner end of the cylindrical stock so as to form a flange.

According to another aspect of the invention, there is provided an apparatus for producing flanged bushes comprising: a die having a through bore having a configuration conforming with the configuration of the flanged bush; a coining punch device disposed at one axial end of the die and adapted to insert a cylindrical stock into the bore in the die; and a flange-forming punch device disposed at the other axial end of the die and adapted to press the inner end of the cylindrical stock in the bore in cooperation with the coining punch device so as to form a flange.

The above and other objects, features and advantages of the invention will become clear from the following description of the preferred embodiment when the same is read in conjunction with the accompanying drawings.

DESCRIPTION OF THE PREFERRED EMBODIMENTS

Figure 1:
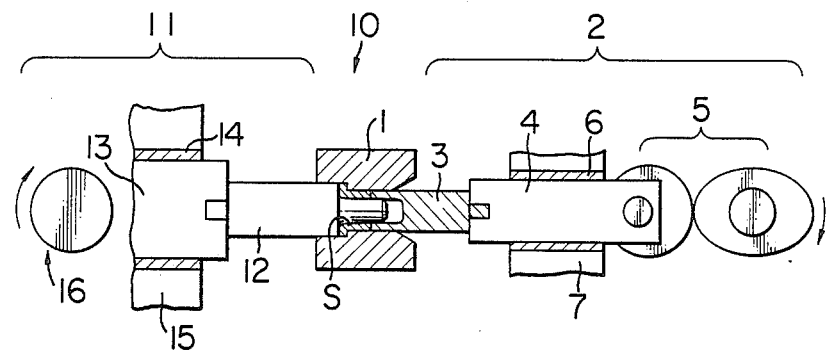
FIG. 1 is a schematic illustration of a first embodiment of an apparatus of the invention for producing a flanged bush.

Referring first to FIG. 1, a first embodiment of the apparatus for producing a flanged bush in accordance with the invention is generally designated by a reference numeral 10. The apparatus 10 includes a die 1 carried by a frame (not shown), a coining punch device 2 and a flange-forming punch device 11. The coining punch device 2 includes a coining punch 3 adapted to be moved axially in a bore 1c of a small diameter formed in the die 1, a coining punch slider 4 connected to this coining punch and a cam-type actuator 5. The coining punch slider 4 is reciprocatably received in a sleeve bearing 6 which is fixed to a coining frame 7. The flange-forming punch device 11 includes a flange-forming punch 12 adapted to reciprocatingly move in a large bore 1a (see FIG. 4a) formed in the die 1, a flange-forming punch slider 13 connected to the flange-forming punch 12, and a crank or cam-type actuator 16 for actuating the punch slider. A flange-forming punch slider 13 is reciprocatably received in a sleeve bearing 14 fixed to the flange-forming frame 15.

In addition to the aforementioned small and large bores 1c and 1a, a frusto-conical bore 1b continuing from the large bore 1a to annular shoulder 1f is formed in the die 1. These bores 1a, 1b and 1c in combination provide a cavity which conforms with the outer configuration of the finished flanged bush.

Figure 2:
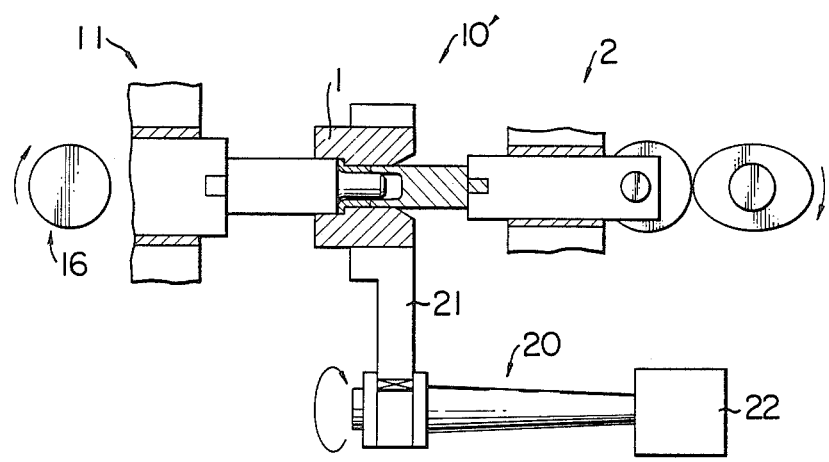
FIG. 2 is a schematic illustration of a second embodiment of the apparatus of the invention for producing a flanged bush.

Referring now to FIG. 2, a second embodiment of the apparatus for producing a flanged bush in accordance with the invention is denoted generally by a reference numeral 10'. This embodiment 10' is distinguished from the first embodiment 10 in that it employs a plurality of dies 1 carried by an indexing device 20 and, hence, is suited to mass-production of flanged bushes. The indexing device 20 has an indexing table 21 carrying a plurality of dies 1 arranged at a constant angular interval, and an indexing mechanism 22 which is operatively connected to the coining punch device 2 and the flange-forming punch device 11 such as to rotate the indexing table 21 intermittently by a predetermined angle. A means for supplying cylindrical stocks of the flanged bush and means for taking out the products are arranged in the vicinity of the indexing table 21.

Figure 3A:
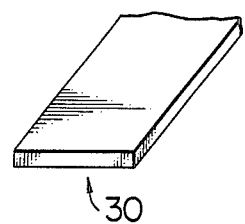
FIG. 3 is a perspective view of a flat sheet from which a flanged bush is produced in accordance with a method of the invention.
FIGS. 3B and 3C are perspective views of cylindrical stocks of flanged bushes with and without a side seam, respectively.
FIGS. 3D to 3G are sectional views of various cylindrical stocks.
Figure 3B:
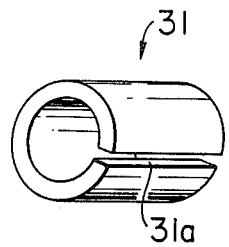
Figure 3C:
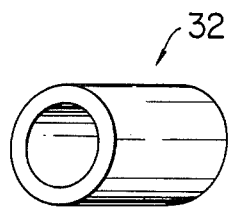
Figure 3D:
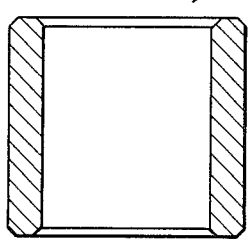
Figure 3E:
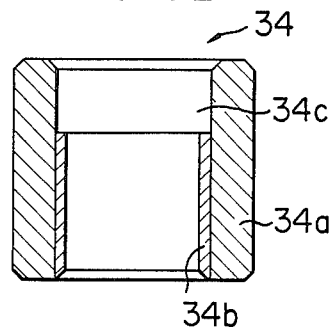
Figure 3F:
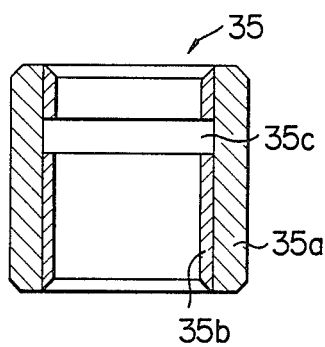
Figure 3G:
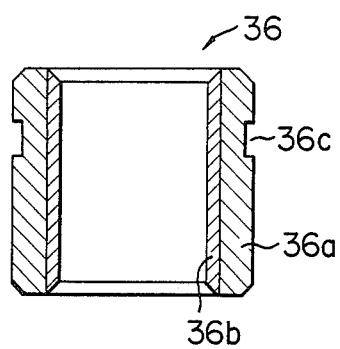

FIGS. 3B to 3G show examples of cylindrical stocks for use in the production of the flanged bush. More specifically, FIG. 3B shows a cylindrical stock of the bush 31 haivng a side seam 31a, formed by bending a flat sheet 30 as shown in FIG. 3A, while FIG. 3C shows a stock 32 having no seam, prepared by, for example, forging, drawing, cutting, pouring or centrifugal casting. These cylindrical stocks can have vertical sections as shown in FIGS. 3D to 3G. The cylindrical stock 33 shown in FIG. 3D is made of a ferrous and nonferrous homogeneous material having good slidability. The cylindrical stocks 34, 35, 36 shown in FIGS. 3E to 3G have bi-metal or multi-layer structures composed of cylindrical ferrous carries 34a, 35a, 36a lined with layers 34b, 35b, 36b of a bearing metal. Notches 34c, 35c, 36c are formed as desired in the outer or inner peripheral surfaces.

Figure 4A:
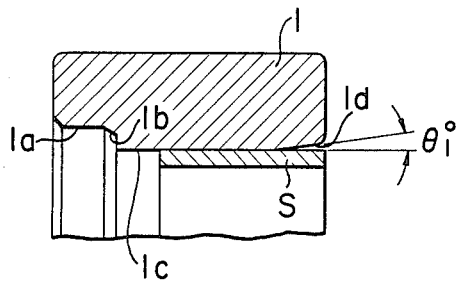
FIGS. 4A to 4F are illustrations of steps of a process for forming flagned bushes from cylindrical stocks.

FIGS. 4A to 4F illustrate a process for forming a collared bush by the apparatus of the invention. In the step shown in FIG. 4A, a cylindrical stock S is driven into the small bore 1c in the die 1 from the right side end of the die 1 by means of the coining punch 3. When the apparatus as shown in FIG. 2 is used, the cylindrical stocks S are fed from the stock feeder (not shown) to the dies 1 carried by the indexing table 21 of the indexing device 20, and are successively brought upon rotation of the indexing table to a position where the die 1 is aligned with the coining punch 3 and the flange-forming punch 12. As shown in FIG. 4A, the brim of the entrance-side end of the small bore 1c formed in the die 1 is tapered at an angle $\frac{1}{2}\theta_1$ to facilitate the insertion of the cylindrical stock. This angle $\theta_1$ ranges between 0° and 90°, preferably between $1\frac{1}{2}$° and 5°.

Figure 4B:
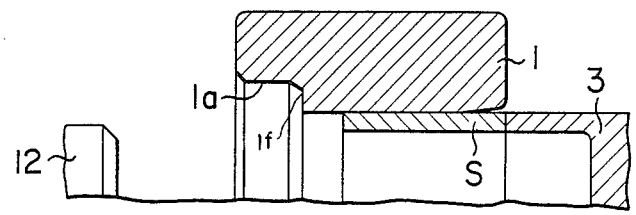

In a step shown in FIG. 4B, the cylindrical stock S received in the small bore 1c in the die 1 is forcibly moved to the left by the coining punch 3.

Figure 4C:
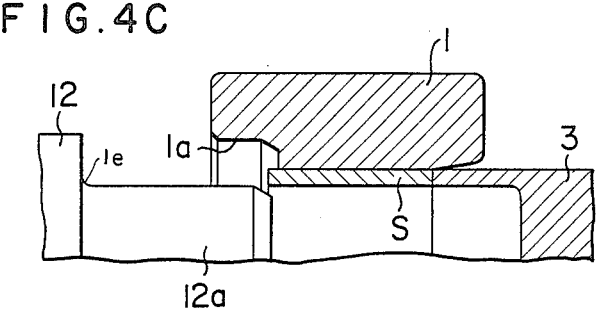

Referring now to FIG. 4C, the flange-forming punch 12 starts to move to the right, while the cylindrical stock S is further moved to the left in the die 1.

Figure 4D:
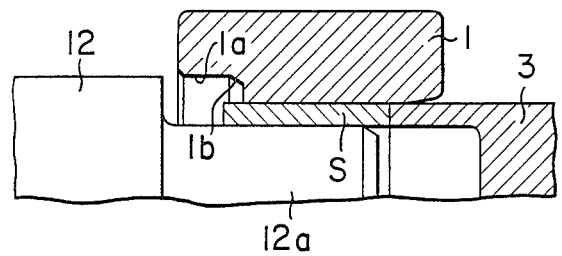

In the step shown in FIG. 4D, the flange-forming punch 12 is further moved to the right until its reduced-diameter portion 12a comes into the cylindrical stock S. It is to be noted that the reduced-diameter portion 12a of the flange-forming punch 12 has a diameter which is slightly smaller than the inside diameter of the cylindrical stock S.

Figure 4E:
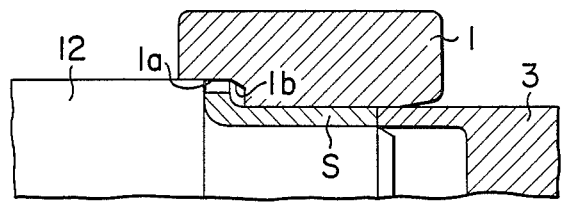

In the next step shown in FIG. 4E, the coining punch 3 and the flange-forming punch 12 are further moved to the left and to the right, respectively, so that the left end of the stock S is expanded radially outwardly as it is pressed by a step, joined to the reduced-diameter portion by concave curvelinear surface 1e, on the flange-forming punch 12.

Figure 4F:
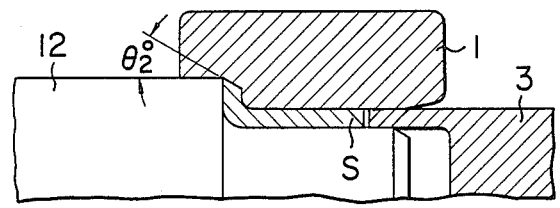

In the final step shown in FIG. 4F, the left end portion of the cylindrical stock S is pressed by the flange-forming punch 12 so that the expanded extremity of the stock is compressed radially along the frustoconical bore 1b of the die 1, while the cylindrical portion of the stock S is compressed axially by the coining punch 3. Consequently, the cylindrical stock S is formed into a flanged bush having an outer configuration conforming with the shape of the cavity defined by the small bore 1c and the frusto-conical bore 1b in the die 1. As shown in FIG. 4F, the frusto-conical bore 1b in the die 1 has a conical angle $\theta_2$ which ranges between 020 and 90°, preferably between 30° and 45°.

Figure 5A:
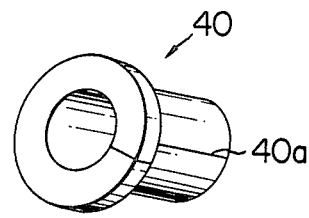
FIGS. 5A and 5B are perspective views of flanged bushes with and without a side seam, respectively.
Figure 5B:
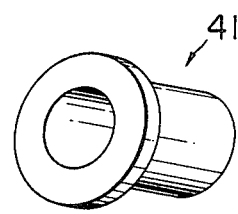
Figure 5C:
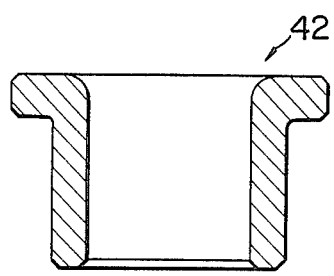
FIGS. 5C to 5F are sectional views of flanged bushes formed from various types of stocks.
Figure 5D:
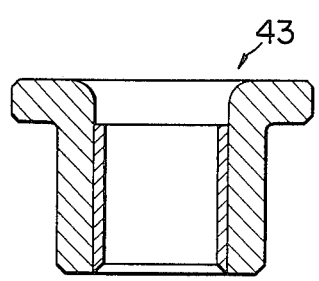
Figure 5E:
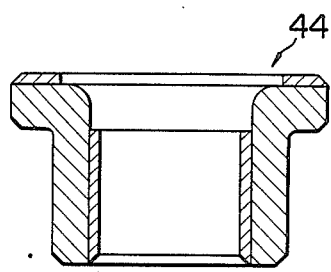
Figure 5F:
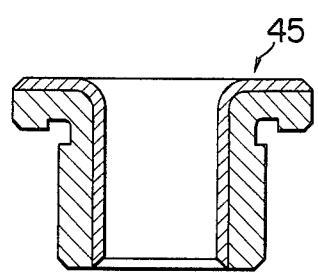

FIGS. 5A to 5F show flanged-bushes 40-45 which are formed from the cylindrical stock S by the production apparatus 10 or 10' of the invention. More specifically, FIG. 5A shows a flanged bush 40 having a seam 40a, manufactured from the seamed cylindrical stock 31 shown in FIG. 3B, while FIG. 5B shows a flanged bush 41 made from a seamed cylindrical stock 32 shown in FIG. 3C. FIGS. 5C to 5F show, respectively, flanged bushes 42 to 45 formed from cylindrical stocks 33 to 36 shown in FIGS. 3D to 3G.

Although the invention has been described through specific terms, it is to be noted here that the described embodiments are only illustrative and various changes and modifications may be imparted thereto without departing from the scope of the invention which is limited solely by the appended claims.

What is claimed is:

1. A method of producing a flanged bush comprising the steps of:
   providing a hollow cylindrical stock;
   providing a die having a bore framed therein axially from one end to the other end thereof, said bore having a widened portion at said other end, a cylindrical portion narrower than said widened portion and of a diameter essentially equal to the outer diameter of said hollow cylindrical stock so that said hollow cylindrical stock may be inserted therein essentially without change in its outer diameter, a first annular shoulder portion having an outer diameter between that of said cylindrical portion and that of said widened portion, and a conical transition portion extending from said first annular shoulder portion to said widened portion, and a part of said bore, including a part of said conical transition portion adjacent said first annular shoulder portion, said cylindrical portion and said first annular shoulder portion, having a configuration conforming with the final shape of the flanged bush;
   providing a flange-forming punch having a reduced diameter portion and a wider flange-forming second annular shoulder portion from which said reduced diameter portion axially and concentrically extends, said reduced diameter portion being of an outer diameter just smaller than the inner diameter of said hollow cylindrical stock, said second annular shoulder portion having an outer diameter just smaller than the inner diameter of said widened portion of said bore, said second annular shoulder portion and said reduced diameter portion being joined by a concave curvelinear surface;
   providing a coining punch at said one end of said die;
   inserting said hollow cylindrical stock into said one end of said die by means of said coining punch;
   driving said reduced diameter portion of said flange-forming punch into said bore from the other end of said die while applying pressure by moving said coining punch against an adjacent first end face of said hollow cylindrical stock in opposition to the motion of said flange-forming punch until said reduced diameter portion fills the entire length of said hollow cylindrical stock, in such a manner that said curvelinear surface first contacts an inner edge of a second end face of said hollow cylindrical stock opposite said coining punch, while said second end face is positioned within said widened portion of said bore;
   driving said second annular shoulder portion of said flange-forming punch against said second end face while applying pressure with said coining punch against said first end face until said hollow cylindrical stock fills said part of said conical transition portion, thus forming a flange in said part of said conical transition portion;
   whereby said curvelinear surface bends said second end face radially outward, and, during said driving step, said second annular shoulder portion and said coining punch cooperate to axially compress said stock and said conical transition portion radially compresses said stock thereby plastically deforming the same.

2. A method of producing a flanged bush according to claim 1, wherein said cylindrical stock is made of a homogeneous, composite or multi-layer material.

3. A method of producing a flanged bush according to claim 1, wherein said cylindrical stock has a seam.

4. A method of producing a flanged bush according to claim 1, wherein said cylindrical stock has no seam.

5. A method of producing a flanged bush according to claim 2, wherein said cylindrical stock has no seam.

6. The method of claim 1, wherein said part of said conical transition portion has a conical angle of between about 30° and 45°.

* * * * *